S. T. SKEEN.
DRILL.
APPLICATION FILED MAR. 24, 1916.
1,211,634.
Patented Jan. 9, 1917.
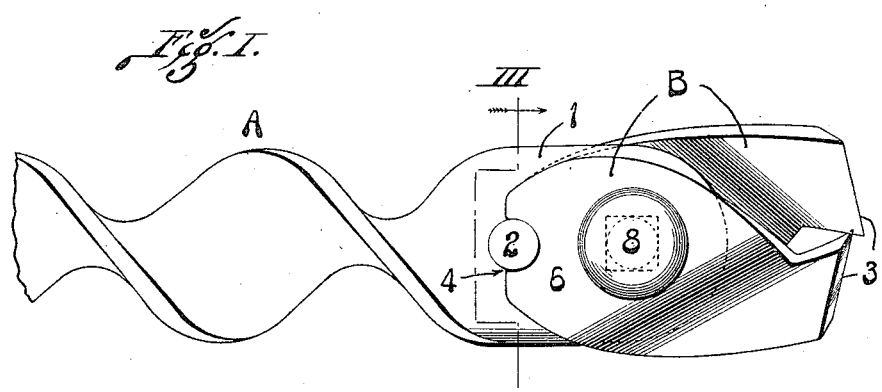
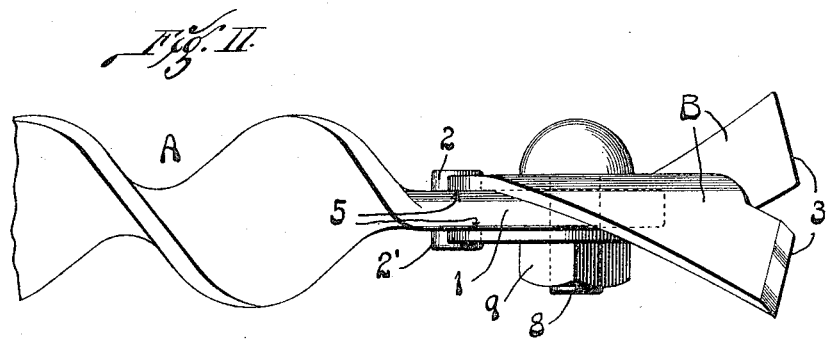
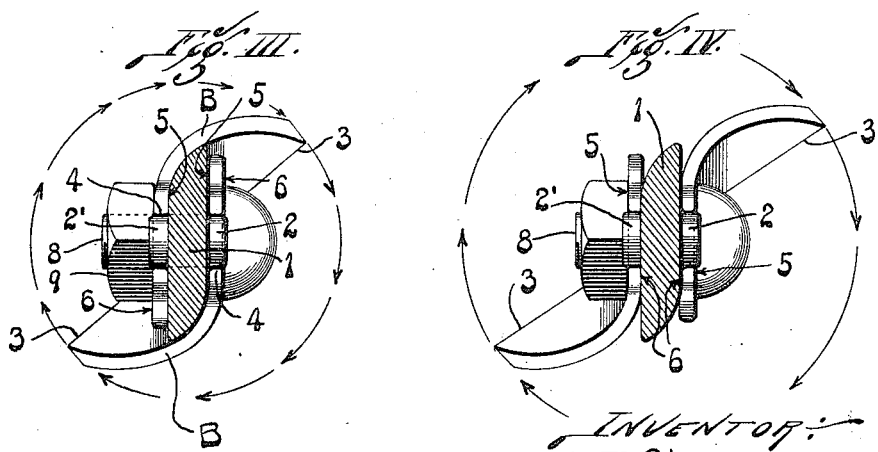
INVENTOR:
S. T. Skeen

UNITED STATES PATENT OFFICE.

SAMUEL T. SKEEN, OF SANDOVAL, ILLINOIS.

DRILL.

1,211,634.  Specification of Letters Patent.  Patented Jan. 9, 1917.

Application filed March 24, 1916. Serial No. 86,353.

*To all whom it may concern:*

Be it known that I, SAMUEL T. SKEEN, a citizen of the United States of America, a resident of Sandoval, in the county of Marion, State of Illinois, have invented certain new and useful Improvements in Drills, of which the following is a full, clear, and exact description, reference being had to the accompanying drawings, forming a part of this specification.

My invention relates to improvements in drills, one of the objects being to produce a simple and inexpensive miner's drill, the elements of which are so constructed that its cutting devices may be made of high grade material without materially increasing the cost of manufacturing the drill. With this object in view the parts are so constructed and arranged that the conveyer stem of an ordinary miner's drill may be easily altered to receive the inexpensive new elements. An old drill stem may be cut off and flattened at one end and otherwise changed to receive the simple fastening devices whereby the blades are to be secured on the flattened portion of the stem. These blades are small inexpensive members, made of material well adapted to withstand the cutting action, and they may be readily sharpened by the operator of the drill. After the blades are worn away to such an extent that they are unfit for service, a new pair of blades may be substituted therefor without renewing or in any way altering the old drill stem.

Another object of the invention is to produce a miner's drill of this kind having its blades and fastening devices constructed and arranged in such a manner that the blades may be interchanged with each other to increase the distance between the extremities of their cutting edges. After the blades have been in use for some time the distance between the extremities of the cutting edges will be so reduced that the diameter of the hole made by the drill will not be large enough to meet the requirements, and the blades may then be interchanged with each other with the result of very materially increasing the distance between their extremities, thereby allowing the blades to be used for a much longer period before discarding them.

Figure I is a plan view of a miner's drill constructed in accordance with the invention. Fig. II is a side elevation of the parts shown in Fig. I. Fig. III is a transverse section on line III—III, Fig. I. Fig. IV is a view similar to Fig. III, showing the blades in different positions.

A designates a drill stem in the form of a spiral conveyer having a flattened end portion 1. The stem may be formed by cutting off the cutting edges of an old miner's drill and then flattening and otherwise altering the end portion of the stem, as shown in the drawings.

2 and 2' designate oppositely disposed alined projections extending from opposite sides of the flattened portion of the drill stem. These projections may be formed by driving a short pin into and through the flattened portion 1.

B designates blades each of which is sharpened at one edge to produce a cutting edge 3, each blade is provided with a recess 4 at its inner edge for the reception of one of the projections 2—2'. The blades may be made exactly alike, and it will be noted that each blade may be fitted to either side of the flattened portion 1. More specifically stated, each blade has a seat 5 adapted to engage one side of the drill stem when the parts occupy the positions shown in Figs. I, II and III, and each blade is also provided with a seat 6 adapted to engage the opposite side of the drill stem when the blades are positioned, as shown in Fig. IV. When the blades are positioned as shown in Figs. I, II and III, the extremities of their cutting edges will travel in the circular path indicated by arrows in Fig. III, and when the blades are interchanged with each other, their extremities will travel in the circular path indicated by arrows in Fig. IV. Obviously, new blades may be positioned on the drill stem as indicated in Figs. I, II and III, and after the blades are worn away to such an extent that the hole drilled thereby will be too small to meet the requirements, the blades may be detached and interchanged to occupy the relative positions shown in Fig. IV. It is, therefore, possible to use the blades for a considerable period of time before discarding them.

The edges of the flattened portion 1 of the drill stem are preferably curved (Figs. III and IV) and each blade may be fitted to one side of said stem with its deflected portion extending partially around a curved edge of the stem, as shown in Fig. III, or the same blade may be fitted to the opposite side of the stem (Fig. IV) so that its deflected portion will extend away from the last mentioned side without lapping an edge of the stem. When the blades occupy the last mentioned position (Fig. IV) the flattened portion 1 of the drill stem is so interposed between the blades that the extremities of the cutting edges 3 will travel in the large circular path indicated by arrows in Fig. IV instead of in the smaller path indicated by arrows in Fig. III.

8 designates a bolt passing through the blades and also through a portion of the stem at points between the cutting edge of the blades and the projections 2—2'. A nut 9 is screwed onto one end of the bolt to clamp the blades onto the stem. Each blade is interlocked with one of the projections 2 or 2', so that it cannot turn on the axis of the bolt 8, and it is retained in interlocking engagement with the stem by means of the bolt 8 and nut 9.

I claim:—

1. A drill having a stem, a pair of blades fitted to opposite sides of said stem, said blades being deflected to lap each other and to extend in opposite directions from points on opposite sides of the axis of the stem, each of said blades having two seats one of which is adapted to engage one side of the stem and the other being adapted to engage the other side of the stem, and said seats being located at opposite sides of each blade so that the blades may be interchanged with each other to increase the distance between the extremities of their cutting edges, and means for securing each blade to either side of said stem.

2. A drill having a stem, a pair of blades fitted to opposite sides of said stem and extending in opposite directions from points on opposite sides of the axis of said stem, said blades being deflected to lap each other at opposite sides of the axis of the stem, each of said blades having two oppositely disposed seats one of which is adapted to engage one side of the stem and the other being adapted to engage the other side of the stem, and said seats being located on opposite sides of each blade, so that each blade may be fitted to one side of the stem with its deflected portion extending partially around an edge of the stem or fitted to the opposite side of the stem so that its deflected portion will extend from the last mentioned side without lapping an edge of the stem, and means for securing each blade to either side of said stem.

3. A drill having a stem, a pair of blades fitted to opposite sides of said stem, said blades being deflected to lap each other and to extend in opposite directions from points on opposite sides of the axis of the stem, each of said blades having two seats one of which is adapted to engage one side of the stem and the other being adapted to engage the other side of the stem, and said seats being located at opposite sides of each blade so that the blades may be interchanged with each other to increase the distance between the extremities of their cutting edges, means for securing each blade to either side of said stem, said means including a screw threaded fastening device extending through both blades, and means for interlocking each blade with either side of said stem.

SAMUEL T. SKEEN.

Copies of this patent may be obtained for five cents each, by addressing the "Commissioner of Patents, Washington, D. C."